(12) United States Patent
Dube et al.

(10) Patent No.: US 8,329,128 B2
(45) Date of Patent: Dec. 11, 2012

(54) GAS TREATMENT PROCESS AND SYSTEM

(75) Inventors: Sanjay Kumar Dube, Knoxville, TN (US); David James Muraskin, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/018,456

(22) Filed: Feb. 1, 2011

(65) Prior Publication Data
US 2012/0195816 A1 Aug. 2, 2012

(51) Int. Cl.
*B01D 53/50* (2006.01)
*B01D 53/62* (2006.01)
*B01D 53/78* (2006.01)

(52) U.S. Cl. ............ 423/220; 423/243.06; 423/DIG. 6; 422/168; 422/169; 422/170; 422/171; 422/172

(58) Field of Classification Search .................. 423/220, 423/243.06, DIG. 6; 422/168, 169, 170, 422/171, 172
See application file for complete search history.

(56) References Cited

U.S. PATENT DOCUMENTS

| | | |
|---|---|---|
| 2,106,734 A | 2/1935 | Gollmar |
| 2,043,109 A | 6/1936 | McKee et al. |
| 2,487,576 A | 11/1949 | Meyers |
| 2,608,461 A | 8/1952 | Frazier |
| 2,878,099 A | 3/1959 | Breuing et al. |
| 3,255,233 A | 6/1966 | Kunze et al. |
| 3,923,955 A | 12/1975 | Fattinger |
| 4,515,760 A | 5/1985 | Lang et al. |
| 4,847,057 A | 7/1989 | Brugerolle et al. |
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii |
| 5,378,442 A | 1/1995 | Fujii et al. |
| 5,427,759 A | 6/1995 | Heitmann |

(Continued)

FOREIGN PATENT DOCUMENTS

AU 648129 7/1992

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Timothy Vanoy
(74) *Attorney, Agent, or Firm* — Robert D. Crawford

(57) ABSTRACT

A gas stream containing carbon dioxide and sulfur dioxide is cleaned by removing, in a sulfur removal stage, sulfur dioxide from the gas stream. Sulfur dioxide is removed from the gas stream by bringing the gas stream into direct contact with ammonia. The used ammonia may be recycled.
In a carbon dioxide removal stage, carbon dioxide is removed from the gas stream depleted in sulfur dioxide by bringing the gas stream into contact with an ammoniated liquid. Following sulfur dioxide and carbon dioxide removal, in an ammonia removal stage, ammonia from the gas stream is removed. Ammonia is removed from the gas stream by bringing the gas stream into direct contact with an acidic liquid to absorb into the acidic liquid, ammonia from the gas stream. The used acidic liquid may be recycled.

21 Claims, 3 Drawing Sheets

U.S. PATENT DOCUMENTS

| | | | |
|---|---|---|---|
| 5,453,115 A | 9/1995 | Vuletic | |
| 5,462,583 A | 10/1995 | Wood et al. | |
| 5,599,508 A | 2/1997 | Martinelli et al. | |
| 5,648,053 A | 7/1997 | Mimura et al. | |
| 5,700,311 A | 12/1997 | Spencer | |
| 5,756,058 A | 5/1998 | Watanabe et al. | |
| 5,832,712 A | 11/1998 | Rønning et al. | |
| 5,853,680 A | 12/1998 | Iijima et al. | |
| 5,979,180 A | 11/1999 | Lebas et al. | |
| 6,027,552 A | 2/2000 | Ruck et al. | |
| 6,210,467 B1 | 4/2001 | Howard | |
| 6,348,088 B2 | 2/2002 | Chung | |
| 6,372,023 B1 | 4/2002 | Kiyono et al. | |
| 6,458,188 B1 | 10/2002 | Mace | |
| 6,485,547 B1 | 11/2002 | Iijima | |
| 6,497,852 B2 | 12/2002 | Chakravarti et al. | |
| 6,506,350 B2 | 1/2003 | Cooper et al. | |
| 6,759,022 B2 | 7/2004 | Hammer et al. | |
| 6,764,530 B2 | 7/2004 | Iijima | |
| 6,936,231 B2 | 8/2005 | Duncan et al. | |
| 7,022,296 B1 | 4/2006 | Khang et al. | |
| 7,083,662 B2 | 8/2006 | Xu et al. | |
| 7,128,777 B2 | 10/2006 | Spencer | |
| 7,160,456 B2 | 1/2007 | Järventie | |
| 7,255,842 B1 | 8/2007 | Yeh et al. | |
| 2003/0045756 A1 | 3/2003 | Mimura et al. | |
| 2003/0140786 A1 | 7/2003 | Iijima | |
| 2004/0123736 A1 | 7/2004 | Torres, Jr. et al. | |
| 2004/0126294 A1 | 7/2004 | Cooper et al. | |
| 2005/0169825 A1 | 8/2005 | Cadours et al. | |
| 2006/0178259 A1 | 8/2006 | Schubert et al. | |
| 2006/0204425 A1 | 9/2006 | Kamijo et al. | |
| 2007/0006565 A1 | 1/2007 | Fleischer et al. | |
| 2008/0072762 A1 | 3/2008 | Gal | |
| 2008/0178733 A1* | 7/2008 | Gal | 95/9 |
| 2008/0307968 A1 | 12/2008 | Kang et al. | |
| 2009/0101012 A1 | 4/2009 | Gal et al. | |
| 2009/0155889 A1 | 6/2009 | Handagama et al. | |
| 2009/0282977 A1 | 11/2009 | Koss | |
| 2011/0052453 A1* | 3/2011 | McLarnon et al. | 422/170 |

FOREIGN PATENT DOCUMENTS

| | | |
|---|---|---|
| AU | 678622 | 6/1995 |
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469 840 | 12/1928 |
| DE | 28 32 493 | 7/1978 |
| DE | 36 33 690 | 4/1988 |
| DE | 10 2005 033 837 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| EP | 2 322 265 | 5/2011 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/094777 | 8/2008 |
| WO | 2008/101293 | 8/2008 |
| WO | 2008/144918 | 12/2008 |
| WO | 2009/091437 | 7/2009 |
| WO | 2010/053683 | 5/2010 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of $CO_2$, $SO_2$ and NOx," Int. J. Environmental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliinary Results" International Journal of Thermodynamics, International Centre for Applied Thermodynamics, Istanbul, TR, vol. 7, No. 4, Dec. 1, 2004, pp. 173-181.

The International Search Report and the Written Opinion of the International Searching Authority for PCT/US2012/021815 dated Apr. 18, 2012.

* cited by examiner

GAS TREATMENT PROCESS AND SYSTEM

TECHNICAL FIELD

The present application relates to processes and systems for removal of contaminants, such as carbon dioxide ($CO_2$) and sulfur dioxide ($SO_2$), from gas streams.

BACKGROUND

In the combustion of a fuel, such as coal, oil, peat, waste etc, in a combustion plant, such as a power plant, a hot process gas is generated, often referred to as a flue gas, containing, among other components, carbon dioxide ($CO_2$). The negative environmental effects of releasing carbon dioxide to the atmosphere have been widely recognized, and have resulted in the development of processes adapted for removing carbon dioxide from the hot process gas generated in the combustion of the above mentioned fuels.

WO 2006/022885 relates to a process for removing $CO_2$ from a flue gas. In the process of WO 2006/022885, flue gas is initially treated by means of conventional air pollution control processes, such as by means of particulate collectors, devices for NOx and $SO_2$ control, acid mist capturing devices etc. Flue gas leaving the conventional air pollution control treatment typically holds a temperature of about 40-80° C. The next step of the process involves cooling of the flue gas to a temperature of, preferably, 0-25° C. In this step, which is often referred to as direct contact cooling, cooling is accomplished by means of cold water. Following cooling, the flue gas is forwarded to a $CO_2$ absorber, in which the actual $CO_2$ removal takes place by bringing flue gas into contact with a low temperature ammoniated slurry or solution having a low carbon dioxide content. This allows absorption of $CO_2$ from the flue gas into the ammoniated slurry or solution. The flue gas leaving the $CO_2$ absorber contains very small amounts of pollutants and carbon dioxide. The $CO_2$ rich ammoniated slurry or solution is regenerated in a regenerator, in which the carbon dioxide is stripped, at a temperature of about 50-200° C. and under high pressure, to form a concentrated $CO_2$-rich stream at the regenerator overhead.

SUMMARY

There is, in a first aspect of the present disclosure, provided a process for cleaning a gas stream containing carbon dioxide and sulfur dioxide, including removal of carbon dioxide from the gas stream in a carbon dioxide removal stage; the process comprising a) removing, in a sulfur removal stage, sulfur dioxide from the gas stream by bringing the gas stream into direct contact with a liquid comprising ammonia, to absorb into the liquid sulfur dioxide from the gas stream such that the gas stream is depleted in sulfur dioxide;

b) cooling, in a gas cooling stage, the gas stream such that a cooled gas stream is formed;

c) removing, in the carbon dioxide removal stage, carbon dioxide from the cooled gas stream depleted in sulfur dioxide by bringing the gas stream into contact with ammoniated liquid to absorb into the liquid carbon dioxide from the gas stream such that the gas stream is depleted in carbon dioxide and enriched in ammonia;

d) removing, in an ammonia removal stage, ammonia from the gas stream depleted in carbon dioxide by bringing the gas stream into direct contact with an acidic liquid, to absorb into the acidic liquid ammonia from the gas stream such that the gas stream is depleted in ammonia; and e) heating, in a gas heating stage, the gas stream depleted in ammonia such that a heated gas stream is formed;

wherein at least a portion of the used liquid from stage a) is withdrawn and directed for reuse in stage a), and at least a portion of the used liquid from stage d) is withdrawn and directed for reuse in stage d).

In the above process, sulfur removal is controlled in a separate stage a) which is independent from cooling and other cleaning stages. This allows for efficient control of removal of sulfur dioxide ($SO_2$), and optionally other acidic gases such as sulfur trioxide ($SO_3$), hydrogen chloride (HCl), and hydrogen fluoride (HF), from the gas stream, which in turn affects the efficiency of the entire gas cleaning process. The reduction of acidic gases in stage a) may eliminate the need for more costly, corrosion resistant materials of construction of downstream equipment. The sulfur removal stage may moreover provide a liquid comprising absorbed sulfur in the form of ammonium sulfate at a concentration that may be kept at a high level independent of ambient conditions.

Similarly, the removal of ammonia from the gas stream in stage d) is controlled independently and separately from removal of other contaminants. This allows for efficient control of ammonia removal from the gas stream and helps to maintain a high concentration of absorbed ammonium in the acidic liquid resulting from stage d) independent of ambient conditions.

As indicated above, cooling is performed in a stage separate from the stages for removal of contaminants. Cooling may be performed in one or more separate cooling steps. It should be understood that cooling may be performed prior to sulfur removal and/or after sulfur removal.

Heating is similarly performed in a separate stage, in one or possibly more heating step(s) for heating the gas stream depleted in ammonia. Following heating, the heated and cleaned gas stream may be released to the environment.

In another aspect of the present disclosure, there is provided a gas cleaning system for cleaning a gas stream containing carbon dioxide and sulfur dioxide, including a carbon dioxide removal arrangement, the system comprising a sulfur removal device arranged upstream of the carbon dioxide removal arrangement, with respect to the flow direction of the gas stream, configured to receive and to bring the gas stream into contact with a liquid comprising ammonia, to form and to discharge a gas stream depleted in sulfur dioxide;

a gas cooling arrangement arranged upstream of the carbon dioxide removal arrangement, with respect to the flow direction of the gas stream, configured to receive and to cool the gas stream, and to discharge a cooled gas stream;

a carbon dioxide removal arrangement comprising at least one carbon dioxide absorber configured to receive the cooled gas stream depleted in sulfur dioxide and to bring the gas stream into contact with ammoniated liquid, to form and to discharge a gas stream depleted in carbon dioxide and enriched in ammonia;

an ammonia removal device arranged downstream of the carbon dioxide removal arrangement, with respect to the flow direction of the gas stream, configured to receive the gas stream from the carbon dioxide removal arrangement and to bring the gas stream into contact with an acidic liquid to form and to discharge a gas stream depleted in ammonia; and a gas heating arrangement arranged downstream of the carbon dioxide removal arrangement, with respect to the flow direction of the gas stream, configured to receive the gas stream depleted in ammonia, to heat the gas stream and to discharge a heated gas stream;

wherein the sulfur removal device is configured to receive and reuse at least a portion of the used liquid discharged from the sulfur removal device, and the ammonia removal device is configured to receive and reuse at least a portion of the used liquid discharged from the ammonia removal device.

It should be understood that the discussion above in respect of the process aspect is, in applicable parts, relevant to the system aspect, as well as it should be understood that the discussion in respect of the system aspect is, in applicable parts, relevant to the process aspect.

Further objects and features of the present invention will be apparent from the detailed description and the claims.

BRIEF DESCRIPTION OF THE FIGURES

Referring now to the Figures, which are exemplary embodiments, and wherein the like elements are numbered alike.

DETAILED DESCRIPTION

Figure 1:
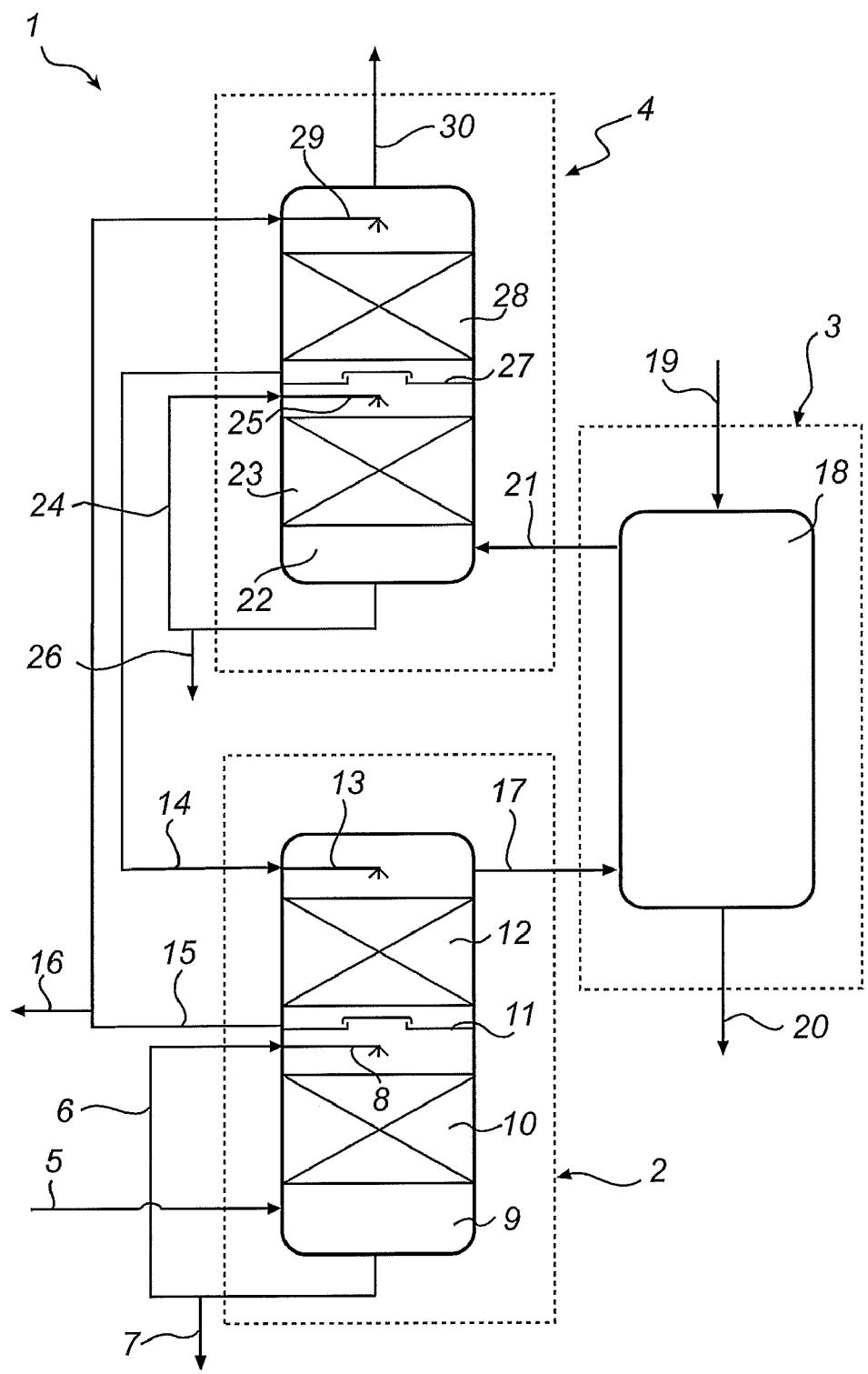
FIG. 1 is a schematic representation depicting one example of a gas cleaning system according to the present disclosure.

The gas cleaning process and system according to the present disclosure may be useful for cleaning of any type of process gas containing carbon dioxide, such as flue gas from any combustion device such as furnaces, process heaters, incinerators, package boilers, and power plant boilers. The hot process gas, or flue gas, generated during combustion of a fuel, such as coal or oil, contains polluting substances, including dust particles, carbon dioxide ($CO_2$), sulfur dioxide ($SO_2$), and sulfur trioxide ($SO_3$). The flue gas may be forwarded to a conventional air pollution control system, which, depending on the source of the gas, may include a dust collector, equipment for $NO_x$ and $SO_2$ control, an acid mist capturing device, a $SO_2$ removal device, sometimes referred to as a Flue Gas Desulfurization system (FGD), and more. $SO_2$ may partly be removed from the flue gas by means of contacting the flue gas with a limestone or lime based slurry or other alkali based liquid in a so-called wet or dry scrubber. The flue gas leaving such a conventional air pollution system, including a $SO_2$ removal device, typically contains less than 200 ppm of $SO_2$, has a temperature of 40-80° C. and is at ambient pressure. The flue gas leaving the conventional air pollution system may moreover be saturated with water depending on the scrubbing method used.

Prior to being treated in a gas cleaning system or according to a gas cleaning process of the present disclosure, the gas stream may be treated in a conventional air pollution system, including a $SO_2$ removal device, as mentioned above.

Despite any pre-treatment, the gas stream entering the gas cleaning process or system of the present disclosure may contain acidic gases, such as residual $SO_2$, $SO_3$, hydrogen chloride (HCl) and hydrogen fluoride (HF). The major part of the $SO_2$ and the other acid gases contained in the gas stream may in general be captured in the sulfur removal stage a) of the process as disclosed herein by absorption into the liquid comprising ammonia.

The liquid comprising ammonia ($NH_3$) and the ammoniated liquid or solution, as used in the sulfur removal stage and/or the carbon dioxide removal stage of the present disclosure, may be any type of liquid containing ammonia, such as a liquid solution, especially an aqueous solution. The ammonia in the ammoniated liquid may e.g. be in the form of ammonium ions and/or dissolved molecular ammonia. The ammoniated liquid is typically aqueous and may be composed of, for example, water, ammonia, ammonium sulfate and derivatives thereof.

The ammoniated liquid may moreover, particularly in the carbon dioxide removal stage, include a promoter to enhance the chemical reaction kinetics involved in the capture of $CO_2$ by the ammoniated liquid. Non-limiting examples of promoters include an amine (e.g. piperazine) or an enzyme (e.g. carbonic anhydrase or its analogs), that may be in the form of a solution or that may be immobilized on a solid or semi-solid surface.

It should be understood that the terms "depleted" and "enriched" as used herein are to be interpreted as relative terms, and not as absolute terms. Thus, when a liquid or gas is described as "depleted" or "enriched" in a certain component, this implies that the liquid has a decreased or increased content in that certain component as compared to the content prior to the process stage causing the depletion or enrichment.

Capturing of $SO_2$ from the gas stream by the liquid comprising ammonia in the sulfur removal stage may be achieved by absorbing or dissolving $SO_2$ into the liquid comprising ammonia to form ammonium sulfite which is oxidized to ammonium sulfate in aqueous solution. Removal of $SO_2$, and optionally other acidic gases, e.g. HCl, HF, $SO_3$ and particulate, typically takes place at the adiabatic saturation temperature in the sulfur removal stage. The cooling stage may be allowed to be operated at low pH, too low for $SO_2$ capture. The moisture condensed from the flue gas in the cooling stage may be evaporated in a cooling tower. The cooling tower may be designed to withstand the acidic conditions.

When sulfur removal in stage a) is conducted before cooling in stage b), the sulfur removal stage may be operated at a high temperature (saturated conditions). A high temperature reduces condensation of water from the gas stream, which in turn may allow for maintenance of a higher ammonium sulfate (AS) concentration in the liquid resulting from stage a), independent of ambient conditions. Thus, depending on the type of gas pre-treatment performed, if any, the sulfur removal stage may take place at e.g. 40° C. to 80° C., such as at 45° C. to 60° C. The liquid comprising ammonia is, following optional removal of precipitated matter, directed for reuse in the sulfur removal stage.

When cooling is conducted before sulfur removal, the sulfur removal stage may be operated at a low temperature, such as 0-20° C., 0-15° C., or at about 5° C. At such a low temperature, very little water remains in the flue gas and no additional moisture will condense from the gas stream. The major part of the moisture may be condensed in the cooling stage prior to the sulfur removal stage. Keeping water condensation at a minimum in the sulfur removal stage may help to maintain a high and constant AS concentration as described above. In addition, performing sulfur removal after cooling and prior to carbon dioxide removal may eliminate the risk of ammonia leaking into gas stream and subsequent cooling liquid(s).

The pH-value of the liquid comprising ammonia ($NH_3$) utilized for sulfur removal may conveniently be controlled to be in the range of between 4 and 6, such as between 5 and 6. The pH control may be achieved by addition of $NH_3$.

Capturing of $CO_2$ from the gas stream by the ammoniated liquid in the carbon dioxide removal stage may be achieved by absorbing or dissolving $CO_2$ in any form into the ammoniated liquid, such as in the form of dissolved molecular $CO_2$, carbonate, carbamate or bicarbonate. $CO_2$ capture with an ammoniated liquid may result in a small amount of ammonia in the gas stream. Thus, ammonia is present in low concentrations in the gas stream leaving the carbon dioxide removal stage, i.e. the gas stream is enriched in ammonia.

Capturing of $NH_3$ from the gas stream by the acidic liquid in the ammonia removal stage may be achieved by absorbing or dissolving ammonia in any form into the acidic liquid, such as in the form of dissolved molecular ammonia. The pH-value of the acidic liquid utilized for ammonia removal may be controlled to be below 4, such as in the range of between 3 and 4. The acidic liquid may be a liquid comprising ammonium sulfate. In this case, pH-control may be achieved by addition of sulfuric acid ($H_2SO_4$) to the liquid. In this way, ammonia removal may be achieved by formation of ammonium sulfate in the liquid. The efficiency of the ammonia removal stage d) may furthermore result in ammonia emissions from a $CO_2$ capture plant to be controlled to the desired environmental and plant permit limits. Following optional removal of any precipitated matter from the liquid, the liquid is reused for ammonia removal in the ammonia removal stage.

Since $NH_3$, as well as $CO_2$, is rather volatile, $CO_2$ removal may typically be performed at a reduced temperature, in order to reduce the loss of $NH_3$ from the ammoniated liquid to the gas stream in the carbon dioxide removal stage. Also, the removal/absorption of $CO_2$ from the gas stream by the ammoniated liquid may be an exothermic reaction. Thus, the gas stream is cooled in the gas cooling stage before it is forwarded to the carbon dioxide removal stage.

The gas cooling stage may comprise at least one gas cooling step for cooling the gas stream to a temperature convenient for $CO_2$ removal and for condensing water from the gas stream. Thus, the gas stream may be cooled to a temperature of less than 20° C., such as within the range of 0-20° C., less than 15° C., such as within the range of 5-15° C., or to a temperature of approximately 5° C., before the gas stream enters the carbon dioxide removal stage.

The gas cooling stage b) may be performed prior to the sulfur removal stage a) or after the sulfur removal stage a).

The gas heating stage may similarly comprise at least one gas heating step for heating of the gas stream before releasing the gas to the environment.

Thus, in one embodiment of the process, the gas cooling stage b) comprises cooling, in a gas cooling step, the gas stream by bringing it into contact with a cooling liquid to allow transfer of heat from the gas to the cooling liquid and to condense water from the gas, such that the gas stream is cooled and the liquid is heated; and the heating stage e) comprises heating, in a gas heating step, the gas stream depleted in ammonia from the ammonia removal stage d) by bringing the gas stream into contact with a heating liquid to allow transfer of heat from the liquid to the gas, such that the gas stream is heated and the liquid is cooled; and the gas cooling step and the gas heating step are in liquid connection such that heat energy of the heated liquid from the gas cooling step is transferred to the cooled liquid from the gas heating step to form a heated liquid for use in the gas heating step and a cooled liquid for use in the gas cooling step.

Thus, the gas cooling and heating steps consequently function as heat-exchanging steps wherein energy in the form of heat is transferred from the gas stream to the cooling liquid in the gas cooling step, resulting in a heated cooling liquid, and from the heating liquid to the gas stream in the gas heating step, resulting in a cooled heating liquid.

The liquid used in the above cooling and heating steps may be any cooling/heating medium suitable for operation in liquid form in a temperature range of from about 5° C. to about 60° C., such as from about 20° C. to about 60° C., typically at atmospheric pressure. Alternatively, the liquid used in the cooling step may be any cooling/heating medium suitable for operation in liquid form in a temperature range of from about 5° C. to about 100° C., such as from about 50° C. to about 80° C., typically at atmospheric pressure, e.g. if the cooling step is performed prior to the sulfur removal step. A non-limiting example of such a conventional cooling/heating medium is water, possibly also containing some additive compounds.

The heated cooling liquid from the gas cooling step may, in one embodiment, be subjected to heat-exchanging with the cooled heating liquid from the gas heating step, to heat the cooled liquid from the gas heating step prior to reuse in the gas heating step and to cool the heated liquid from the gas cooling step prior to reuse in the gas cooling step. The cooled liquid resulting from heat-exchanging may be subjected to further cooling in e.g. a process cooling tower prior to being redirected to the gas cooling step.

As used herein, "heat-exchanging" or "heat-exchange" implies a process step wherein heat is deliberately transferred from one medium, e.g. gas, liquid, to another medium. Heat-exchange results in one medium leaving the process step cooler and one medium leaving the process step warmer than before the process step. Heat-exchange may be direct, wherein the two media physically meet, or indirect, wherein the media are separated, e.g. by a solid wall allowing heat transfer. Heat-exchanging may for example take place in a packed column, a tray column, a plate and frame heat exchanger or a shell and tube heat exchanger.

In another embodiment, the same liquid is used for cooling in the gas cooling step as for heating in the gas heating step. Thus, the gas cooling step and the gas heating step are in liquid connection such that at least a portion of the heated liquid from the gas cooling step is withdrawn and directed for use as a heating liquid in the gas heating step, and at least a portion of the cooled liquid from the gas heating step is withdrawn and directed for use in the gas cooling step as the cooling liquid.

The gas cooling step as described above, also referred to as the first gas cooling step, may be conducted either as a first step of the process as disclosed herein, or after the sulfur removal stage.

To further recover heat energy when the same liquid is used in the gas cooling and gas heating steps as described above, the process may further comprise cooling, in a liquid cooling step, the cooled liquid from the gas heating step by bringing the cooled liquid into contact with the acidic liquid from the ammonia removal stage, prior to directing the cooled liquid for use in the cooling step as described above (henceforth denoted as the first gas cooling step) and the acidic liquid for use in the ammonia removal stage, to allow transfer of heat from the cooled liquid to the acidic liquid, such that the cooled liquid is further cooled and the acidic liquid is heated. Thus, the liquids are subjected to heat-exchanging in order to further cool the liquid destined for gas cooling and to heat the liquid destined for ammonia removal. Heating of the acidic liquid prior to redirecting it to the ammonia removal stage in this way may be helpful in controlling the overall water balance. A liquid cooling step as the one described above may conveniently be included in the process where the ambient conditions and, where applicable, the process cooling tower and/or evaporative condenser are such as to require e.g. further cooling of liquid and hence the gas stream of the gas cooling step.

In some instances, the cold energy from the acidic liquid may be utilized to cool some of the other process streams within other parts of the gas cleaning process.

Moreover, in some instances, for example when the gas stream entering the process of the present disclosure holds a high temperature, further cooling may be required such that the desired low temperature of the gas entering the $CO_2$ removal stage may be reached. In such cases, the cooling stage b) of the process may further comprise cooling, in a second gas cooling step, the gas stream from the first gas cooling step by bringing the gas stream into contact with a second cooling liquid to allow transfer of heat from the gas to the cooling liquid and to condense water from the gas, such that the gas stream is cooled and the liquid is heated. The liquid used for cooling the gas stream may e.g. be water. Any condensate may be drawn off from the used liquid, and the liquid may optionally be redirected for use in the second gas cooling step.

It should be understood that the gas cooling stage may comprise any suitable number of gas cooling steps, such as at least one gas cooling step, and in some instances two gas cooling steps as described above. In other instances, the gas cooling stage may include three, four or more gas cooling steps. In such cases, the gas cooling steps may optionally be in liquid contact, such that a liquid used for cooling in one step may be forwarded for use in a cooling operation in another step.

Similarly, the gas heating stage may comprise one or more, e.g. two, gas heating steps for heating the gas stream before releasing it to the environment. The number of gas heating steps may be adapted in order to ensure that the gas buoyancy is sufficient for release in e.g. a plant chimney.

Depending on, for example, ambient conditions, the process may moreover comprise cooling, in a second liquid cooling step, the heated liquid from the second gas cooling step by subjecting the heated liquid to heat-exchanging with a cooling medium, such that a cooled liquid is formed; and directing the cooled liquid for reuse as the second cooling liquid in the second gas cooling step. The equipment used for providing the cooling medium prior to use in the second liquid cooling step may be a mechanical chiller arrangement with refrigerant or a process cooling tower using ambient conditions. It is to be understood that the temperature of the cooling medium used in this liquid cooling step may vary as a function of ambient conditions. Similarly, if a mechanical chiller arrangement is used, the chiller duty may vary as a function of ambient conditions. The use of a process cooling tower for cooling of the cooling medium prior to use in the second liquid cooling step may moreover allow for removal of excess condensed moisture from the process due to evaporation.

It should be noted that the discussion of different parameters relevant to examples of the gas cleaning process are, where applicable, equally relevant to the following examples of a gas cleaning system.

According to the present disclosure of a gas cleaning system, the gas cooling arrangement may be arranged downstream of the sulfur removal device, with respect to the flow direction of the gas stream, and configured to receive the gas stream depleted in sulfur dioxide from the sulfur removal device. Alternatively, the sulfur removal device may be arranged downstream of the gas cooling arrangement, with respect to the flow direction of the gas stream, and configured to receive the cooled gas stream from the gas cooling arrangement.

According to the present disclosure of a gas cleaning system, the gas cooling arrangement comprises a gas cooling device, configured to receive the gas stream and to bring the gas stream into contact with a cooling liquid, to form and to discharge a cooled gas stream and a heated liquid; and the gas heating arrangement comprises a gas heating device configured to receive the gas stream depleted in ammonia discharged from the ammonia removal device and to bring the gas stream into contact with a heating liquid, to form and to discharge a heated gas stream and a cooled liquid.

The system as described immediately above may moreover comprise a heat-exchanger, configured to receive the cooled liquid from the gas heating device and to bring it into contact with the heated liquid from the gas cooling device, to form and discharge a heated heating liquid for reuse in the gas heating device and a cooled cooling liquid for reuse in the gas cooling device.

In an alternative embodiment of a system as described above, the gas heating device may be configured to receive at least a portion of the heated liquid discharged from the gas cooling device for use as the heating liquid, and the gas cooling device may be configured to receive at least a portion of the cooled liquid discharged from the gas heating device for use as the cooling liquid.

When the gas heating device and the gas cooling device as described above are arranged in liquid connection such that liquid used for cooling/heating in one device is forwarded for use as cooling/heating liquid in the other device, the system may, in some instances, comprise a heat-exchanger configured to receive the cooled heating liquid from the gas heating device and to bring it into contact with the acidic liquid from the ammonia removal device, to form and to discharge a cooled cooling liquid for use in the gas cooling device and a heated acidic liquid for reuse in the ammonia removal device.

The gas cooling arrangement may further comprise a second gas cooling device configured to receive the gas stream discharged from the abovementioned gas cooling device (henceforth denoted the first gas cooling device) and to bring the gas stream into contact with a second cooling liquid, to form and to discharge a cooled gas stream and a heated liquid. It should be noted that the gas cooling arrangement may comprise at least one gas cooling device. When appropriate, the gas cooling arrangement may comprise two, three, four or more gas cooling devices configured to cool the gas stream to a temperature suitable for efficient $CO_2$ removal.

The system may furthermore comprise a liquid cooling device configured to receive at least a portion of the heated liquid discharged from the second gas cooling device and to bring the heated liquid into contact with a cooling medium, to form and to discharge a cooled liquid; wherein the second gas cooling device is configured to receive at least a portion of the cooled liquid discharged from the liquid cooling device for use as the second cooling liquid. As described above in relation to the second liquid cooling step, the liquid cooling device may for example be a mechanical chiller arrangement with refrigerant or a process cooling tower using ambient conditions.

With reference to FIG. 1, a specific example of a gas cleaning system will now be discussed. The gas cleaning system 1 comprises a pre-conditioning section 2, a $CO_2$ removal section 3, also generally referred to as a $CO_2$ absorption section, and a post-conditioning section 4. The pre- and post-conditioning sections are arranged in liquid connection such that liquid used in one of the sections may be reused in another section as explained in further detail below.

The pre-conditioning section 2, which is arranged upstream of the $CO_2$ removal section 3, with respect to the flow direction of the gas stream, comprises a number of gas-liquid contacting devices for directly contacting the gas stream with a liquid. The post-conditioning section 4, which is arranged downstream of the $CO_2$ removal section 3, with respect to the flow direction of the gas stream, similarly comprises a number of gas-liquid contacting devices for directly contacting the gas stream with a liquid.

The gas-liquid contacting devices of the pre- and post-conditioning sections may be integrated in vessels comprising more than one gas-liquid contacting device arranged in sequence, such that a gas stream which is fed to the vessel enters and exits each gas-liquid contacting device in sequence, before exiting the vessel. Alternatively, each of the gas-liquid contacting devices of the pre- and post-conditioning sections may independently be arranged as separate gas-liquid contacting vessels connected in series, such that the gas stream enters and exits each gas-liquid contacting vessel in sequence.

Each gas-liquid contacting device is arranged to bring the gas stream into contact with a liquid. The contacting may be performed in counter current flow such that the gas enters the gas-liquid contacting device at one end (typically at the bottom) and the liquid solution enters the gas-liquid contacting device at the other end (typically at the top).

Liquid used in one gas-liquid contacting device is generally at least partly collected at the bottom of the gas-liquid contacting device or in a separate buffer or storage tank in liquid connection with the bottom of the gas-liquid contacting device, such that liquid exiting the gas-liquid contacting device is collected therein. In an integrated vessel as described above, liquid may be collected and withdrawn from one gas-liquid contacting device and optionally redirected to the same or another gas-liquid contacting device, located upstream or downstream of the first device.

The flue gas is forwarded in the opposite direction and may pass through or alongside the collected liquid. In this case, a liquid collection receptacle may be arranged in between two gas-liquid contacting devices, whether arranged separately or integrated, and may, for example, comprise a sloped collection tray or bubble cap tray. Such liquid collection receptacles may further comprise one or more liquid outlets configured for removal of the collected liquid.

The pre-conditioning section 2 of the system 1 in FIG. 1 receives a gas stream, such as flue gas, via a gas inlet 5 at the bottom 9 of a gas-liquid contacting device 10. The gas-liquid contacting device, also referred to as the sulfur removal device 10, is configured to remove $SO_2$ from the flue gas. In the sulfur removal device 10, flue gas, having a temperature of, for example, 40-80° C., such as 45-60° C., is forwarded upwards and contacted with a liquid comprising ammonia having a pH-value of approximately 4-6 at flue gas saturation temperature. The liquid is supplied via pipe 6 and distributed over the sulfur removal device by a set of nozzles 8 or pipes with holes for liquid distribution. The sulfur removal device 10 contains a structured packing, or another suitable gas-liquid contacting filling.

$SO_2$, and optionally other acidic gases such as HCl, HF, $SO_3$, is removed from the flue gas by formation of ammonium sulfate upon contact with the ammonia comprised in the liquid. The used liquid, containing e.g. 0-40%, such as 15-40% ammonium sulfate by weight, is collected in a liquid collection receptacle at the bottom 9 of the sulfur removal device. Dissolved ammonium sulfate is removed by a bleed stream 7. The remaining liquid is via pipe 6 directed for reuse in the sulfur removal device 10. The pH-value of the liquid may be adjusted by addition of ammonia to the bottom 9 of the device.

The flue gas depleted in $SO_2$ leaving the sulfur removal device 10 enters another gas-liquid contacting device 12 via the liquid collection receptacle 11. The gas-liquid contacting device 12, containing a structured packing, or another suitable gas-liquid contacting filling, is also referred to as the gas cooling device 12. The flue gas thus passes through the liquid used in the gas cooling device before entering the gas cooling device 12. In the gas cooling device 12, the flue gas depleted in $SO_2$, still having a high temperature of, e.g. 40-80° C., such as 45-60° C., is, while forwarded upwards, directly contacted with a cooling liquid. The cooling liquid, having a temperature of, for example, 5-35° C. depending on ambient conditions and for example process cooling tower operation, and consisting essentially of water, is supplied via pipe 14 and distributed by a set of nozzles 13, or pipes with holes for liquid distribution, over the gas cooling device. The gas cooling device 12 thus functions as a heat-exchanging device by transferring heat from the flue gas to the cooling liquid. In addition, any water is condensed from the flue gas.

The thus heated liquid formed in the gas cooling device 12 is collected in the liquid collection receptacle 11, withdrawn via pipe 15 and forwarded for use in the post-conditioning section 4 as described below. A bleed stream, containing flue gas condensate liquid, is via pipe 16 withdrawn from the used liquid.

The pre-conditioning section of the system 1 of FIG. 1 thus provides a cool and $SO_2$ depleted flue gas for supply via duct 17 to the $CO_2$ removal section 3. The $CO_2$ removal section is set up essentially as described in WO 2006/022885. The type of carbon dioxide removal section described in WO 2006/022885 is sometimes referred to as a Chilled Ammonia Process (CAP). A flue gas temperature of 0-25° C., such as 0-10° C., is suitable for the $CO_2$ removal section 3.

The $CO_2$ removal section 3 comprises a single $CO_2$ absorber 18, or a series of $CO_2$ absorbers (not shown), in which the flue gas is brought into contact with ammoniated liquid, supplied via pipe 19. $CO_2$ is captured into the ammoniated liquid and the resulting $CO_2$ enriched slurry or solution 20 is passed, for example by means of a high pressure pump, from the absorber(s) 18 to a regenerator (not shown). High pressure and high temperature in the regenerator causes the release of high-pressure gaseous $CO_2$. The $CO_2$ lean ammoniated liquid or slurry resulting from regeneration is cooled and forwarded for reuse in the $CO_2$ absorber 18 via pipe 19.

A duct 21 is operative for forwarding flue gas, having a low concentration of $CO_2$, from the $CO_2$ absorber(s) 18 to the post-conditioning section 4. Prior to processing in the post-conditioning section, the flue gas may optionally be subjected to water wash (not shown) in order to remove ammonia from the flue gas.

The post-conditioning section 4 thus receives $CO_2$ depleted flue gas, having a temperature of, for example, 0-25° C., such as 0-10° C. or such as 0-5° C., and an ammonia content of, for example, 200 ppm, from the $CO_2$ removal section 3. The post-conditioning section comprises at least a first gas-liquid contacting device 23, also referred to as the ammonia removal device 23, which is arranged to receive the flue gas supplied via duct 21 via the liquid collection receptacle 22. The ammonia removal device 23 is arranged to, at least partly, remove ammonia from the flue gas by bringing the flue gas into direct contact with acidic liquid comprising ammonium sulfate and having a pH-value of approximately 3-4. The acidic liquid is supplied via pipe 24 and distributed over the ammonia removal device 23 by a set of nozzles 25, or by pipes with holes for liquid distribution. The flue gas enters at the bottom of the device 23 and is forwarded upwards through the device 23. In the ammonia removal device 23, which contains a structured packing or another suitable gas-liquid contacting filling, the flue gas is contacted with the liquid having a low temperature. Ammonium sulfate at a concentration of, for example, 0-40%, such as 15-40% or 30-35% by weight, is formed in the liquid and removed by bleed stream 26. The remaining acidic liquid is, via pipe 24, directed for reuse in the ammonia removal device. If needed, the pH-value of the liquid may be adjusted by addition of $H_2SO_4$ to the bottom of the device.

The flue gas depleted in ammonia is forwarded from the ammonia removal device to a second gas-liquid contacting device of the post-conditioning section 4. The second gas-liquid contacting device 28 is also referred to as the gas heating device 28. The flue gas passes through the liquid collection receptacle 27, in which the liquid used in the gas heating device 28 is collected. The gas heating device 28, containing a structured packing or another suitable gas-liquid contacting filling, is arranged to bring the flue gas, having essentially the same temperature as when entering the ammonia removal device, into direct contact with a heating liquid. The heating liquid, supplied via pipe 15 and distributed over the device 28 by a set of nozzles 29 or by pipes with holes for liquid distribution, is essentially the same liquid as used for cooling in the gas cooling device 12 of the pre-conditioning section 2. The liquid thus has a temperature of, for example, 40-80° C., such that 45-60° C., that roughly corresponds to the temperature of the flue gas entering the gas cooling device 12. When the liquid is contacted with the flue gas in the gas heating device 28, heat is transferred from the liquid to the flue gas. The cleaned and heated flue gas, having a temperature of, e.g. 40-60° C., leaves the gas heating device via duct 30 and is released to stack. The used liquid, having a lower temperature after passing the device as compared to before entering the device, is collected in the liquid collection receptacle 27, withdrawn via pipe 14 and directed for use in the gas cooling device 12 of the pre-conditioning section, optionally via a process cooling tower (not shown).

The post-conditioning section 4 thus provides post-cleaning of the flue gas by removal of ammonia and heating of the flue gas, before releasing a cleaned and heated flue gas to stack.

Figure 2:
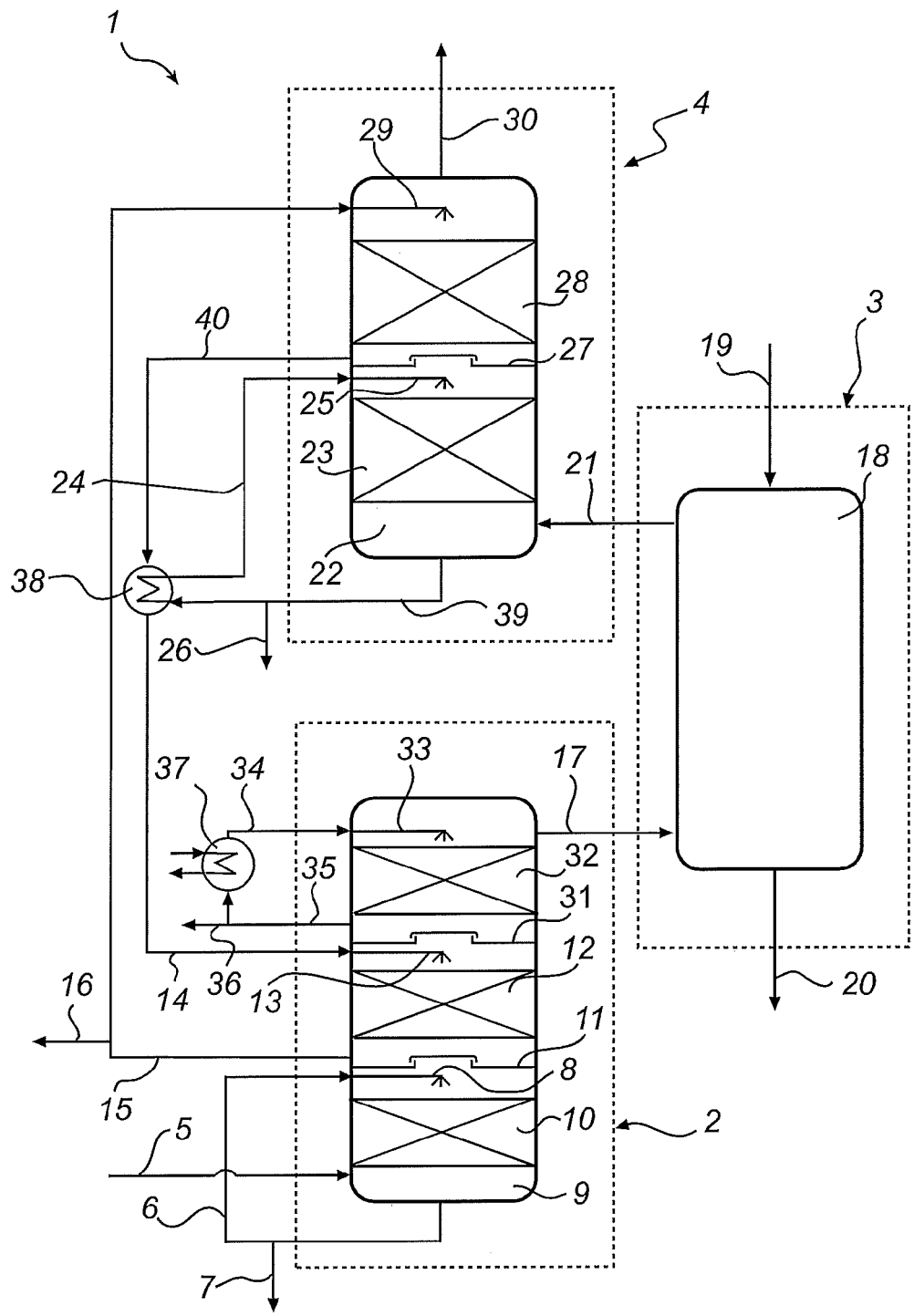
FIG. 2 is a schematic representation depicting one example of a gas cleaning system according to the present disclosure.

With reference to FIG. 2, another specific example of a gas cleaning system will now be discussed.

The gas cleaning system 1 as depicted in FIG. 2 comprises a pre-conditioning section 2, a $CO_2$ removal section 3 and a post-conditioning section 4, all in principle arranged as described for the system of FIG. 1. The pre-conditioning section 2 of the system 1 in FIG. 2 however comprises three gas-liquid contacting devices.

The gas-liquid contacting devices of the pre-conditioning section consist in a sulfur removal device 10, corresponding to the sulfur removal device of the system in FIG. 1, a first gas cooling device 12, corresponding to the gas cooling device of the system in FIG. 1, and a second gas cooling device 32 as will be described in more detail below.

Cooled flue gas depleted in $SO_2$ resulting from the gas cooling device 12 enters the second gas cooling device 32 via the liquid collection receptacle 31. In the second gas cooling device 32, containing a structured packing or another suitable gas-liquid contacting filling, the flue gas is directly contacted with a second cooling liquid, supplied via pipe 34 and distributed over the device by a set of nozzles 33 or by pipes with holes for liquid distribution. The flue gas, having a temperature of, for example, 25° C., depending on the ambient conditions, is forwarded upwards and cooled upon contact with the second cooling liquid, having a temperature of, for example, 5° C. In addition, water may be condensed from the flue gas. The cooled flue gas leaving the second gas cooling device is via duct 17 forwarded to the $CO_2$ removal section 3, whereas the used cooling liquid, consisting e.g. of water, is collected in liquid collection receptacle 31.

The used cooling liquid is thereafter withdrawn via pipe 35 and directed to a heat-exchanger 37, configured to cool the used liquid. In the heat-exchanger, the used liquid is contacted with another cooling medium, for example a cooling medium coming e.g. from a mechanical chiller using a refrigerant such as ammonia. The cooled liquid resulting from the heat-exchanger is via pipe 34 directed to the second gas cooling device. Bleed stream 36 removes condensate from the used cooling liquid before directing it to the heat-exchanger.

Following sulfur removal, cooling and condensation in the pre-conditioning section 2, the flue gas is forwarded to the $CO_2$ removal section 3, which functions essentially as described in relation to the discussion of system 1 of FIG. 1.

Following $CO_2$ capture in the $CO_2$ removal section 3, the flue gas is forwarded to the post-conditioning section 4. The post-conditioning section 4 of FIG. 2 comprises two gas-liquid contacting devices; an ammonia removal device 23, corresponding essentially to the ammonia removal device 23 of the system of FIG. 1, and a gas heating device 28, corresponding essentially to the gas heating device 28 of the system of FIG. 1.

The system of FIG. 2 however additionally comprises a heat-exchanger 38, configured to cool the used liquid 40 originating from the gas heating device 28 by contacting it with the used acidic liquid 39 originating from the ammonia removal device 23. By contacting the used liquid of pipe 40 with the used acidic liquid of pipe 39, heat is transferred to the acidic liquid. The thus cooled liquid 14, originating from the gas heating device 28, is forwarded to the gas cooling device 12 of the pre-conditioning section 2.

Figure 3:
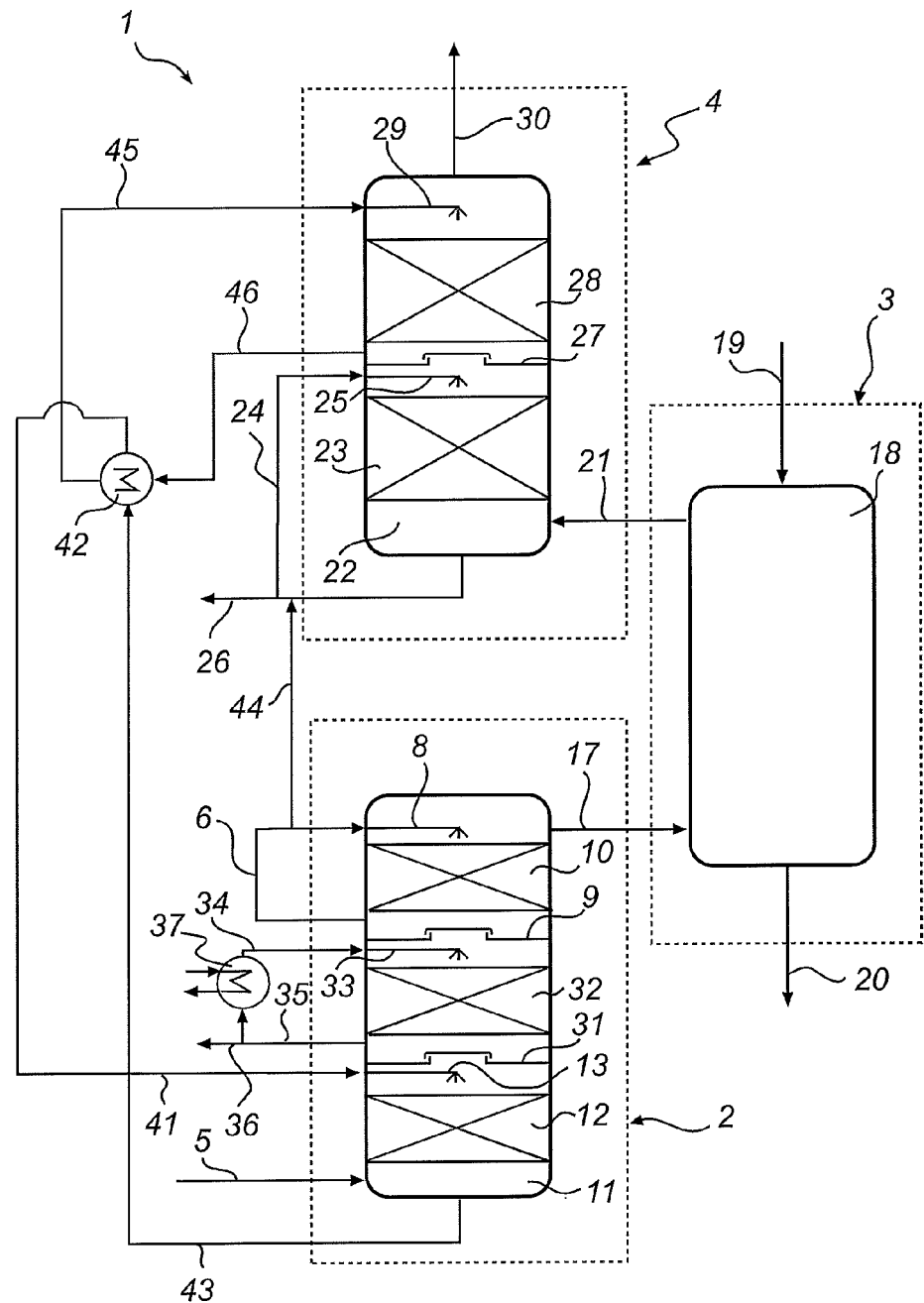
FIG. 3 is a schematic representation depicting one example of a gas cleaning system according to the present disclosure.

With reference to FIG. 3, another specific example of a gas cleaning system will now be discussed.

The gas cleaning system 1 as depicted in FIG. 3 comprises a pre-conditioning section 2, a $CO_2$ removal section 3 and a post-conditioning section 4. The $CO_2$ removal section 3 and the post-conditioning section 4 are essentially arranged as described for the system of FIG. 1. The pre-conditioning section 2 of the system 1 in FIG. 3 is described below.

The pre-conditioning section 2 of the system 1 in FIG. 3 receives a gas stream, such as flue gas, via a gas inlet 5 at the bottom 11 of the gas cooling device 12. The flue gas is forwarded upwards in the gas cooling device 12, containing a structured packing or another suitable gas-liquid contacting filling as previously described, where it is directly contacted with a cooling liquid. The flue gas, having a temperature of, for example, 40-80° C., such as 45-60° C., is cooled and water is condensed from the gas upon contact with the cooling liquid, supplied via pipe 41 and distributed over the device by a set of nozzles 13, or pipes with holes for liquid distribution.

The used cooling liquid is withdrawn from the bottom 11 of the device via pipe 43 and forwarded to a heat-exchanger 42, where it is contacted with the used heating liquid 46 from the gas heating device 28. The heat-exchanger 42 allows for heat-exchanging between the liquids such as to provide a heated heating liquid, supplied via pipe 45 for use in the gas heating device 28, and a cooled cooling liquid, supplied via pipe 41 for use in the gas cooling device 12. The cooling liquid 41 may optionally be further cooled in a process cooling tower (not shown), using ambient conditions, prior to being directed to the cooling device 12.

The cooled flue gas, having a temperature of, for example 25° C., depending on the ambient conditions, resulting from the gas cooling device 12 enters a second gas cooling device 32 via a liquid collection receptacle 31. The second gas cooling device 32 of FIG. 3 corresponds essentially to the second gas cooling device 32 of FIG. 2 and is operated correspondingly.

Following cooling and condensation in the second gas cooling device 32 as previously described, the flue gas enters the sulfur removal device 10 as the last gas-liquid contacting device of the pre-conditioning section via liquid collection receptacle 9. The sulfur removal device 10 is essentially constructed as described in relation to FIG. 1. However, in the system of FIG. 3, removal of $SO_2$ is performed at a low gas temperature, such as a temperature of 0-25° C., such as 0-10° C., such as at about 5° C. As previously described, $SO_2$, and optionally other acidic gases such as HCl, HF, $SO_3$, is removed from the flue gas by formation of ammonium sulfate upon contact with the ammonia comprised in the liquid supplied via pipe 6. The used liquid, containing e.g. 0-40%, such as 15-40% ammonium sulfate by weight, is collected in the liquid collection receptacle 9 and withdrawn from the sulfur removal device. The low temperature in the sulfur removal device 10 eliminates condensation from the flue gas and consequently dilution of the dissolved ammonium sulfate in bleed stream 44. Bleed stream 44 is combined with the used liquid 24 containing absorbed ammonia from the ammonia removal device 23 into a common bleed stream 23. In this way, a high ammonium sulfate concentration may be maintained in the bleed stream irrespective of ambient conditions.

The pre-conditioning section 2 of the system as depicted in FIG. 3 thus provides cooled flue gas depleted in $SO_2$ and, optionally, other acidic gases. Ammonia slips from the sulfur removal device into e.g. cooling liquids may moreover be kept at a minimum, reducing the need for separate waste liquid treatments for ammonia.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for cleaning a gas stream containing carbon dioxide and sulfur dioxide, including removal of carbon dioxide from the gas stream in a carbon dioxide removal stage; the process comprising
    a) removing, in a sulfur removal stage, sulfur dioxide from the gas stream by bringing the gas stream into direct contact with a liquid comprising ammonia, to absorb into the liquid sulfur dioxide from the gas stream such that the gas stream is depleted in sulfur dioxide;
    b) cooling, in a gas cooling stage, the gas stream such that a cooled gas stream is formed;
    c) removing, in the carbon dioxide removal stage, carbon dioxide from the cooled gas stream depleted in sulfur dioxide by bringing the gas stream into contact with ammoniated liquid to absorb into the liquid carbon dioxide from the gas stream such that the gas stream is depleted in carbon dioxide and enriched in ammonia;
    d) removing, in an ammonia removal stage, ammonia from the gas stream depleted in carbon dioxide by bringing the gas stream into direct contact with an acidic liquid, to absorb into the acidic liquid ammonia from the gas stream such that the gas stream is depleted in ammonia; and
    e) heating, in a gas heating stage, the gas stream depleted in ammonia such that a heated gas stream is formed;
    wherein at least a portion of the used liquid from stage a) is withdrawn and directed for reuse in stage a), and at least a portion of the used liquid from stage d) is withdrawn and directed for reuse in stage d).

2. The process of claim 1, wherein stage a) is performed before stage b).

3. The process of claim 1, wherein stage b) is performed before stage a).

4. The process of claim 1, wherein
the cooling stage b) comprises
cooling, in a gas cooling step, the gas stream by bringing it into contact with a cooling liquid to allow transfer of heat from the gas to the cooling liquid and to condense water from the gas, such that the gas stream is cooled and the liquid is heated; and
the heating stage e) comprises
heating, in a gas heating step, the gas stream depleted in ammonia from stage d) by bringing the gas stream into contact with a heating liquid to allow transfer of heat from the liquid to the gas, such that the gas stream is heated and the liquid is cooled; and
the gas cooling step and the gas heating step are in liquid connection such that heat energy of the heated liquid from the gas cooling step is transferred to the cooled liquid from the gas heating step to form a heated liquid for use in the gas heating step and a cooled liquid for use in the gas cooling step.

5. The process of claim 4, wherein the heated liquid from the gas cooling step is subjected to heat-exchanging with the cooled liquid from the gas heating step, to heat the cooled liquid from the gas heating step prior to reuse in the gas heating step and to cool the heated liquid from the gas cooling step prior to reuse in the gas cooling step.

6. The process of claim 4, wherein the gas cooling step and the gas heating step are in liquid connection such that at least a portion of the heated liquid from the gas cooling step is withdrawn and directed for use as a heating liquid in the gas heating step, and at least a portion of the cooled liquid from the gas heating step is withdrawn and directed for use in the gas cooling step as the cooling liquid.

7. The process of claim 6, further comprising
cooling, in a liquid cooling step, the cooled liquid from the gas heating step by bringing the cooled liquid into contact with the acidic liquid from the ammonia removal stage, prior to directing the cooled liquid for use in the gas cooling step and the acidic liquid for reuse in the ammonia removal stage, to allow transfer of heat from the cooled liquid to the acidic liquid, such that the cooled liquid is further cooled and the acidic liquid is heated.

8. The process of claim 4, wherein
the cooling stage b) further comprises
cooling, in a second gas cooling step, the gas stream from the gas cooling step of claim 4 by bringing the gas stream into contact with a second cooling liquid to allow transfer of heat from the gas to the cooling liquid and to condense water from the gas, such that the gas stream is cooled and the liquid is heated.

9. The process of claim 8, further comprising
cooling, in a second liquid cooling step, the heated liquid from the second gas cooling step by subjecting the heated liquid to heat-exchanging with a cooling medium, such that a cooled liquid is formed; and
directing the cooled liquid for reuse as the second cooling liquid in the second gas cooling step.

10. The process of claim 1, wherein the pH-value of the liquid comprising ammonia utilized for sulfur removal is controlled to be in the range of between 4 and 6.

11. The process of claim 1, wherein the pH-value of the acidic liquid utilized for ammonia removal is controlled to be below 4.

12. The process of claim 11, wherein the pH-value of the acidic liquid is controlled by addition of sulfuric acid.

13. A gas cleaning system for cleaning a gas stream containing carbon dioxide and sulfur dioxide, including a carbon dioxide removal arrangement, the system comprising
- a sulfur removal device arranged upstream of the carbon dioxide removal arrangement, with respect to the flow direction of the gas stream, configured to receive and to bring the gas stream into contact with a liquid comprising ammonia, to form and to discharge a gas stream depleted in sulfur dioxide;
- a gas cooling arrangement arranged upstream of the carbon dioxide removal arrangement, with respect to the flow direction of the gas stream, configured to receive and to cool the gas stream, and to discharge a cooled gas stream;
- a carbon dioxide removal arrangement comprising at least one carbon dioxide absorber configured to receive the cooled gas stream depleted in sulfur dioxide and to bring the gas stream into contact with ammoniated liquid, to form and to discharge a gas stream depleted in carbon dioxide and enriched in ammonia;
- an ammonia removal device arranged downstream of the carbon dioxide removal arrangement, with respect to the flow direction of the gas stream, configured to receive the gas stream from the carbon dioxide removal arrangement and to bring the gas stream into contact with an acidic liquid to form and to discharge a gas stream depleted in ammonia; and
- a gas heating arrangement arranged downstream of the carbon dioxide removal arrangement, with respect to the flow direction of the gas stream, configured to receive the gas stream depleted in ammonia, to heat the gas stream and to discharge a heated gas stream;
- wherein the sulfur removal device is configured to receive and reuse at least a portion of the used liquid discharged from the sulfur removal device, and the ammonia removal device is configured to receive and reuse at least a portion of the used liquid discharged from the ammonia removal device.

14. The system of claim 13, wherein the gas cooling arrangement is arranged downstream of the sulfur removal device, with respect to the flow direction of the gas stream, and is configured to receive the gas stream depleted in sulfur dioxide from the sulfur removal device.

15. The system of claim 13, wherein the sulfur removal device is arranged downstream of the gas cooling arrangement, with respect to the flow direction of the gas stream, and is configured to receive the cooled gas stream from the gas cooling arrangement.

16. The system of claim 13, wherein
- the gas cooling arrangement comprises a gas cooling device, configured to receive the gas stream and to bring the gas stream into contact with a cooling liquid, to form and to discharge a cooled gas stream and a heated liquid; and
- the gas heating arrangement comprises a gas heating device configured to receive the gas stream depleted in ammonia discharged from the ammonia removal device and to bring the gas stream into contact with a heating liquid, to form and to discharge a heated gas stream and a cooled liquid.

17. The system of claim 16, comprising a heat-exchanger, configured to receive the cooled liquid from the gas heating device and to bring it into contact with the heated liquid from the gas cooling device, to form and discharge a heated heating liquid for reuse in the gas heating device and a cooled cooling liquid for reuse in the gas cooling device.

18. The system of claim 16, wherein the gas heating device is configured to receive at least a portion of the heated liquid discharged from the gas cooling device for use as the heating liquid, and the gas cooling device is configured to receive at least a portion of the cooled liquid discharged from the gas heating device for use as the cooling liquid.

19. The system of claim 18, comprising a heat-exchanger configured to receive the cooled heating liquid from the gas heating device and to bring it into contact with the acidic liquid from the ammonia removal device, to form and to discharge a cooled cooling liquid for use in the gas cooling device and a heated acidic liquid for reuse in the ammonia removal device.

20. The system of claim 16, wherein the gas cooling arrangement further comprises
- a second gas cooling device configured to receive the gas stream discharged from the gas cooling device of claim 16 and to bring the gas stream into contact with a second cooling liquid, to form and to discharge a cooled gas stream and a heated liquid.

21. The system of claim 20, further comprising
- a liquid cooling device configured to receive at least a portion of the heated liquid discharged from the second gas cooling device and to bring the heated liquid into contact with a cooling medium, to form and to discharge a cooled liquid;
- wherein the second gas cooling device is configured to receive at least a portion of the cooled liquid discharged from the liquid cooling device for use as the second cooling liquid.

* * * * *